United States Patent
D'Annunzio

(10) Patent No.: US 6,643,274 B2
(45) Date of Patent: Nov. 4, 2003

(54) ROUTING IP PACKETS TO AN AIRCRAFT

(75) Inventor: Michael A. D'Annunzio, Redmond, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/210,224

(22) Filed: Aug. 1, 2002

(65) Prior Publication Data

US 2003/0048786 A1 Mar. 13, 2003

Related U.S. Application Data

(60) Provisional application No. 60/316,411, filed on Aug. 31, 2001.

(51) Int. Cl.[7] ............................ H04L 12/64; H04Q 7/20
(52) U.S. Cl. ........................ 370/316; 370/401; 709/238
(58) Field of Search ................................ 370/252, 316, 370/401, 402, 475; 709/238

(56) References Cited

U.S. PATENT DOCUMENTS

| | | | |
|---|---|---|---|
| 5,533,026 A | 7/1996 | Ahmadi et al. | |
| 6,084,870 A | 7/2000 | Wooten et al. | |
| 6,130,892 A | 10/2000 | Short et al. | |
| 6,147,980 A | 11/2000 | Yee et al. | |
| 6,167,239 A | 12/2000 | Wright et al. | |
| 6,173,159 B1 | 1/2001 | Wright et al. | |
| 6,175,867 B1 | 1/2001 | Taghadoss | |
| 6,353,734 B1 | * 3/2002 | Wright et al. ................. 455/98 |
| 6,529,706 B1 | * 3/2003 | Mitchell ..................... 455/12.1 |
| 2002/0059614 A1 | * 5/2002 | Lipsanen et al. .............. 725/75 |
| 2003/0069990 A1 | * 4/2003 | D'Annunzio et al. ....... 709/242 |
| 2003/0084130 A1 | * 5/2003 | D'Annunzio ............... 709/220 |
| 2003/0084174 A1 | * 5/2003 | D'Annunzio et al. ....... 709/230 |

FOREIGN PATENT DOCUMENTS

| | | |
|---|---|---|
| EP | 1 011 241 A1 | 6/2000 |
| WO | WO 01/06732 A1 | 1/2001 |

* cited by examiner

Primary Examiner—Melvin Marcelo
(74) Attorney, Agent, or Firm—Harness Dickey & Pierce P.L.C.

(57) ABSTRACT

A system and method for routing IP packets to an aircraft eliminates the need for the exchange of routing information via dynamic routing protocols between the aircraft and ground station routers. An Internet protocol (IP) packet routing table is populated by converting a tail number of the aircraft into a destination subnet address for the aircraft. Forward channel information for a ground router is determined based on the tail number. The method further provides for adding a route entry to the routing table based on the forward channel information and the destination subnet address such that the route entry enables the ground router to delivery IP packets to the aircraft.

20 Claims, 3 Drawing Sheets

ROUTING IP PACKETS TO AN AIRCRAFT

CROSS-REFERENCE TO RELATED APPLICATIONS

This application claims priority from U.S. provisional application Ser. No. 60/316,411, filed Aug. 31, 2001.

BACKGROUND OF THE INVENTION

1. Technical Field

The present invention generally relates to the routing of internet protocol (IP) packets. More particularly, the invention relates a system and method for routing IP packets to an aircraft that does not require the exchange of routing information via dynamic routing protocols between the aircraft and ground station routers.

2. Discussion

Although the Internet has often been referred to as one of the 20$^{th}$ century's greatest communications developments, a number of challenges still lie ahead. A particular challenge results from the increasing mobility of today's society. Indeed, the benefits of being able to access the Internet via a mobile terminal are numerous. For example, traffic updates, stock quotes, and e-mail messaging are but a few of the many services for which consumers would undoubtedly pay a premium in the mobile context. Thus, while the traditional desktop personal computer (PC) was once viewed as the basic tool for accessing the Internet, laptops, palm-held computers and wireless telephones are rapidly becoming the computer terminal of choice.

As the demand for Internet access via these new highly mobile terminals increases, the difficulties associated with transitioning traditional packet switched networks into over-air networks have become quite apparent. The data network industry has attempted to tackle these difficulties by developing a "Mobile IP" scheme in which a "bidirectional" link is established between the mobile computing device (i.e., client node) and the routers other hosts out on the network. The computing device and the routers all have IP addresses, and the bi-directional link essentially provides a one-to-one default relationship between the forward and return paths for IP packets. The path information is updated as the computing device moves from sub-network to sub-network. Thus, when a packet needs to be sent to such a device, the routers are better able to correlate a path for the content because the bi-directional link assists in the correlation. This ability is important because packet routing is often the single most difficult problem to be dealt with when implementing an IP networking system.

Although Mobile IP and traditional packet routing techniques have been satisfactory for "terrestrial-based" systems such as wireless phones, certain difficulties remain when the user terminal is located on an aircraft. For example, the traditional bi-directional link is difficult to maintain because the aircraft communicates with the ground via multiple unidirectional satellite links. In addition, the ground router will have to identify the subset of the available unidirectional links that a given aircraft is using to receive packets. Thus, the ground router might have sixteen forward channel chains to choose from, whereas the aircraft might only have the ability to listen to four of the channels. It is easy to understand that it is quite difficult to resolve a correct path to the aircraft under conventional routing approaches. Simply put, the complexity associated with using conventional routing exchange protocols to communicate with an aircraft eliminates the commercial viability of such a system. Routing exchangers also consume expensive air-to-ground bandwidths. It is therefore desirable to provide a method and system for routing IP packets to an aircraft that does not require the use of an air-to-ground routing protocol.

SUMMARY OF THE INVENTION

The above and other objectives are provided by a method for populating an Internet protocol (IP) packet routing table of a ground router in accordance with the principles of the present invention. The method includes the step of converting a tail number of an aircraft into a destination subnet address for the aircraft. Forward channel information for a ground router is determined based on the tail number. The method further provides for adding a route entry to the routing table based on the forward channel information and the destination subnet address such that the route entry enables the ground router to deliver IP packets to the aircraft.

Further in accordance with the present invention, a method for maintaining an IP communications link table is provided. The method provides for defining forward channel identifiers for a plurality of aircraft tail numbers. Preference metrics are defined for the plurality of aircraft tail numbers such that each tail number, corresponding forward channel identifier and corresponding preference metric represents an entry in the communications link table. The method further provides for dynamically updating the entries based on data from an airborne polling link.

In another aspect of the invention, an IP database has an aircraft configuration table, a communications link table and a ground switching table. The aircraft configuration table links a tail number of the aircraft to a corresponding aircraft identifier, while the communications link table links the tail number to forward channel information. The ground switching table links the forward channel information to a next hop address such that the database enables addition of a routing entry to a routing table.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and sub-joined claims and by referencing the following drawings, in which:

FIG. 3 is a diagram showing tables of an Internet protocol database in accordance with the principles of the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 1:
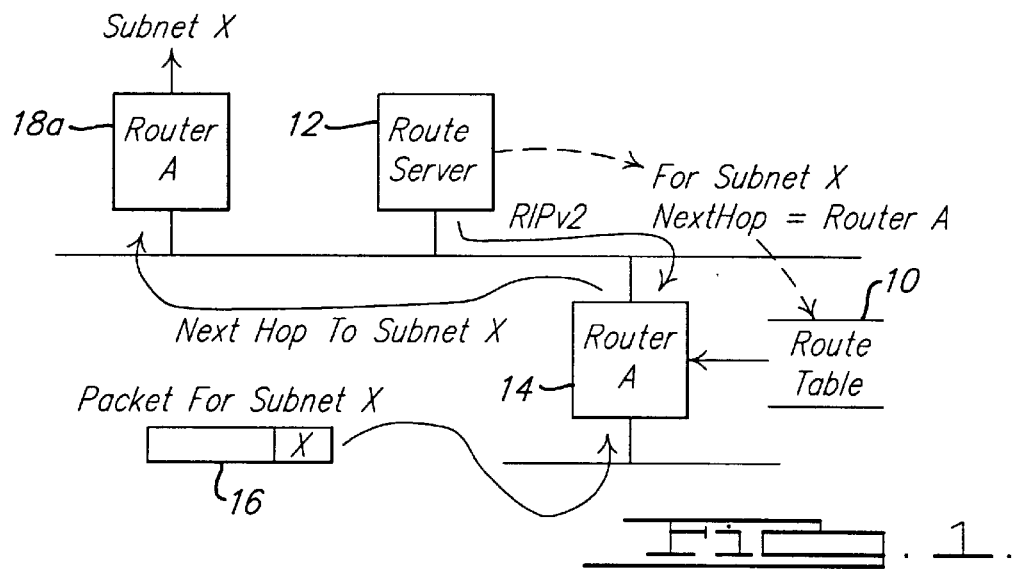
FIG. 1 is a block diagram demonstrating the delivery of a packet to a subnet in accordance with the principles of the present invention.

Turning now to FIG. 1, it will be appreciated that the present invention provides a unique mechanism for populating an Internet protocol (IP) packet routing table 10. Generally, an airborne router (not shown) and a ground router 14 need to share routing information in order to support packet forwarding. This involves informing the ground router 14 of new routes as airplanes register and removing old routes as airplanes de-register. It should be noted that reverse channel routing is not an issue because the airborne router can route all packets not addressed to onboard subnets to a reverse transponder channel (transmit channel) by default. Nevertheless, the ground router 14 must direct packets addressed to a specific airborne subnet to the transponder channel(s) to which the destination airborne data transceiver/router (DTR) is listening.

Thus, routing table 10 is used to send IP packet 16 to an aircraft subnet (Subnet X) and is accessible from both a route server 12 and the ground router 14. The routing table 10 has route entries that enable the ground router 14 to deliver the packet 16 to the aircraft containing Subnet X. In so doing, the routing table 10 provides a next hop IP address corresponding to a forward link modulator 18a (as opposed to other forward link modulators that the destination airborne DTR is not listening to). It is important to note that the entries in routing table 10 do not result from the traditional routing protocols resulting from dynamic links. As such, the present invention represents a marked improvement over conventional approaches.

Specifically, it will be appreciated that it is quite difficult and complicated to use conventional routing exchange protocols with unidirectional satellite links. It will further be appreciated that all the information necessary to derive routing updates can be made available to the network operations center (NOC) without using an air-to-ground routing protocol. Furthermore, static information elements can be stored in ground-based databases and dynamic information elements can be provided by a NOC communications link manager. Thus, by using pre-existing and available information it is possible to derive a routing database that associates airborne subnet numbers with the IP addresses of ground RTS (GRTS) forward channel chains.

It can therefore be seen that the route server 12 is an NOC or ground station-based function that collects the above information and uses it to derive the routing table 10. It can be seen that the route server 12 preferably transmits routing updates to the ground router 14 using routing information protocol (RIP) Version 2 triggered update messages in accordance with request for comments (RFC) 2453. The route server 12 utilizes the next hop field in the RIPv2 response message to carry the IP address of the forward channel chain. Alternatively, the border gateway protocol (BGP-4 RFC 1771) can be used to update the routing table 10. Nevertheless, for a given airborne subnet the route server 12 sets the next hop field equal to the IP address of the GRTS forward transponder chain previously allocated to the destination aircraft and sends the RIPv2 response message to the ground router 14.

Figure 2:
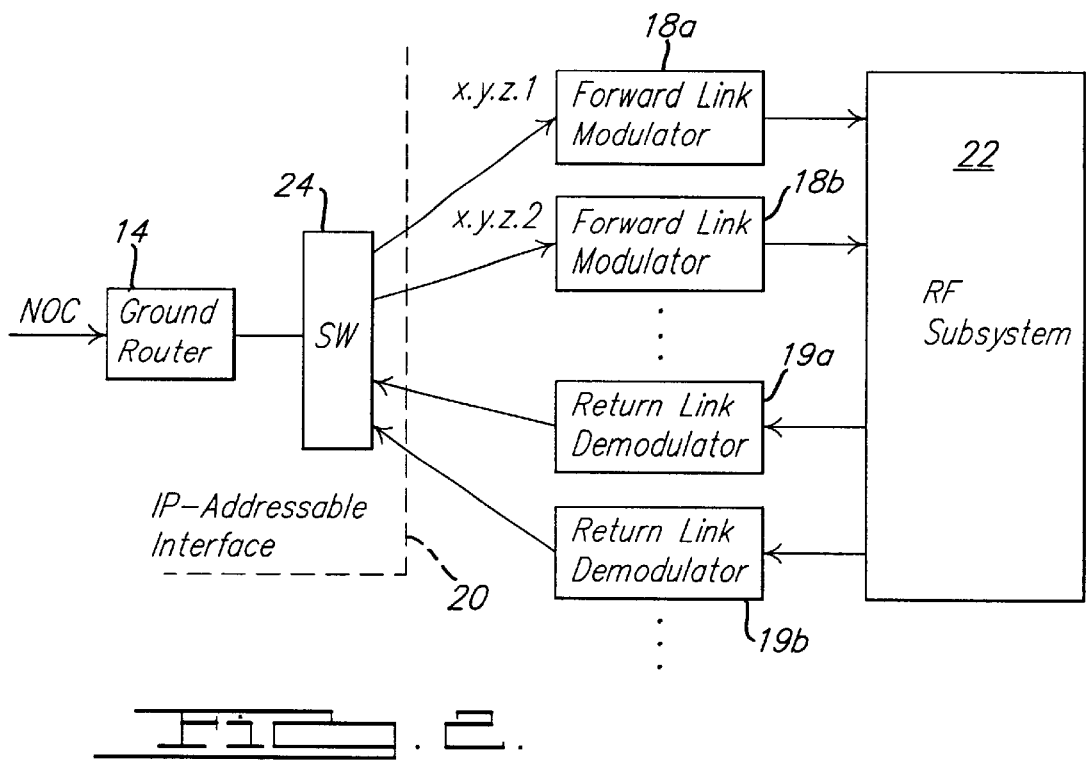
FIG. 2 is a block diagram demonstrating a ground-based Internet protocol addressable interface in accordance with the principles of the present invention.

FIG. 2 therefore illustrates that a logical IP-addressable interface 20 exists between the ground router 14 and the various forward link modulators 18 and return link de-modulators 19 necessary to interact with an RF subsystem 22. Thus, a switching device 24 can select between forward link modulators 18 based on the next hop IP address for a given packet.

Turning now to FIG. 3, the process of populating the IP packet routing table will be described in greater detail. Generally, it can be seen that the present invention is able to convert a tail number of an aircraft into a destination subnet address for the aircraft. Forward channel information for the ground router is then determined based on the tail number. The method further provides for adding a route entry to the routing table based on the forward channel information and the destination subnet address such that the route entry enables the ground router to deliver IP packets to the aircraft.

Construction of the Destination Subnet Address

It will generally be appreciated that each aircraft is assigned a unique aircraft identifier (ACID) during initial system installation. The ACID is used to create a unique subnet address that is also assigned to the aircraft during initial system installation. It can further be seen that during takeoffs the ACID is retrieved from an aircraft configuration table 26 based on the tail number. A subnet class is determined for the aircraft and is allocated from an air-to-ground network (AGN) address space (to be described in greater detail below). This enables conversion of the aircraft identifier into the destination subnet address in accordance with the subnet class. Specifically, it can be seen that the ACID is a numerical value that is used to construct an aircraft-unique IP subnet address. The presently preferred class is private class A subnet: 10.0.0.0/8. It is further preferred that a 22-bit subnet mask is defined by borrowing 14 bits from the host part (14 bits for subnets and 10 bits for hosts). Thus, a 14-bit field [a . . . a] for the ACID supports 16,382 unique airborne networks. Furthermore, a 10-bit field [d . . . d] is used to identify hosts and supports up to 1,022 hosts or other devices. The result is therefore

| ACID | Device |
|---|---|
| [10.] [aaaaaaaaaaaaaa] | [dddddddddd] |
| 10.aaaaaaaa.aaaaaadd.dddddddd/22 | |

An exemplary conversion of tail number UN087345 corresponding to entry 32a in aircraft configuration table 26, is described as follows:

1. From table 26, ACID for Tail # UN0087345=00012
2. $00012_{10}$=00000000001100
3. [10.] [00000000001100] [0000000000]
4. 10.00000000.00110000.00000000
5. UN087345's AGN subnet address=10.0.48.0/22

Determination of Forward Channel Information

The forward channel information is determined by retrieving information such as forward channel identifiers and preference metrics from a communications link table 28 based on tail number. Each preference metric defines a relative preference of data transmitted over the forward channel versus data transmitted over other forward channels. Additional forward channel information such as next hop addresses can be retrieved from a ground switching configuration table 30 based on forward channel identifier.

Generally, the communications link table 28 holds forward channel assignments for the aircraft. As will be discussed below, the content is dynamically created and updated by the NOC-based communications link manager.

Table 28 also gives forward channel use preferences (by metric). Thus, channels with equal metrics can be used for load balancing. The ground switching configuration table 30 associates IP addressable GRTS interfaces with forward transponder channels. It is preferred that the content is created during GRTS installation and configuration. Packets forwarded by the ground router to an IP address in table 30 will result in packet transmissions over the corresponding forward transponder channel.

An exemplary determination of forward channel information for tail number UN087345 would involve locating entry 32b in table 28, which indicates that Channel 1 is to be used with a preference metric of 1. By locating entry 32c in table 30, it can be determined that channel 1 has an IP address of x.y.z.1.

Building the Route Entry

Figure 4:
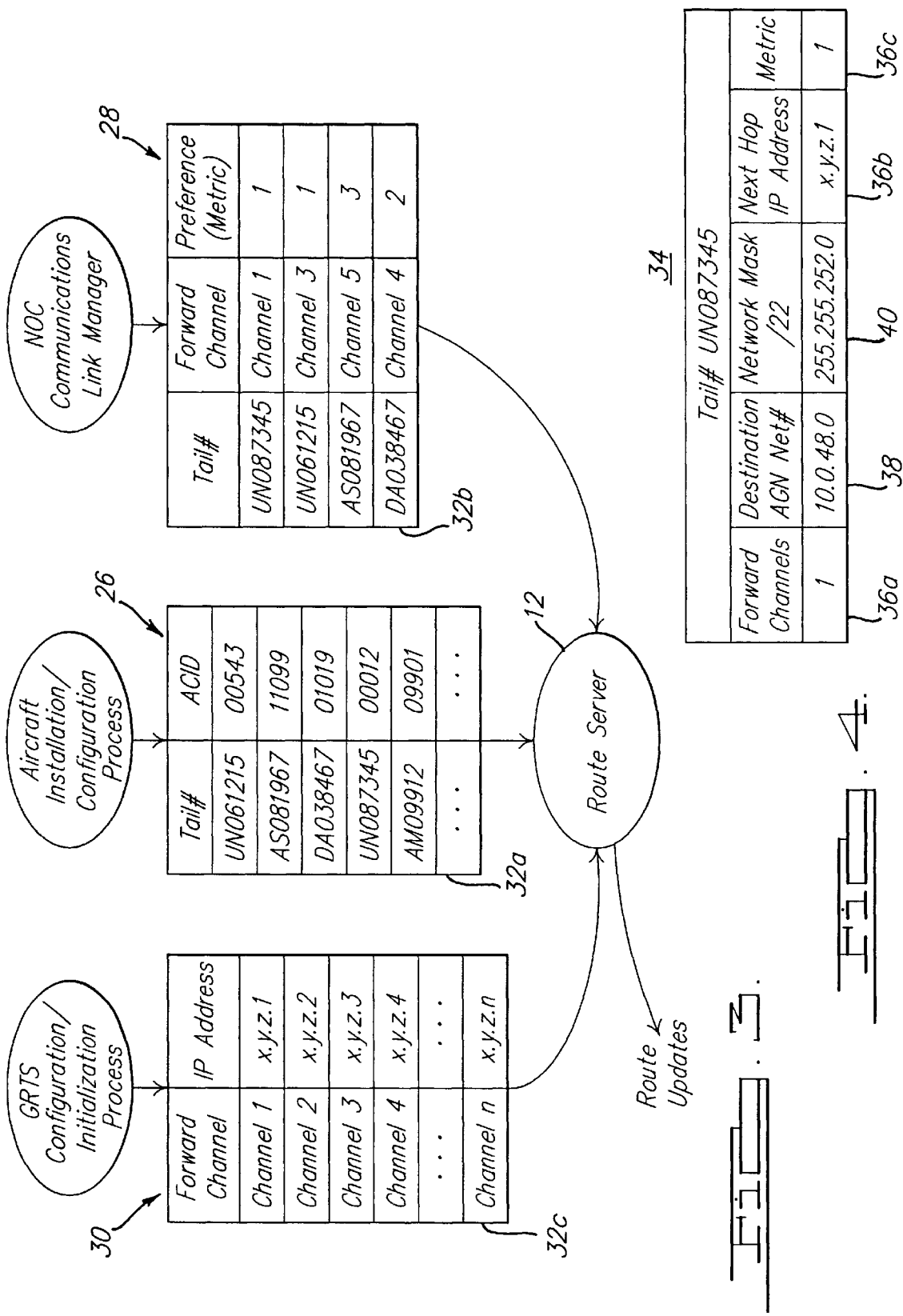
FIG. 4 is a diagram of a route entry in accordance with the principles of the present invention.

FIG. 4 illustrates that a route entry 34 can be built based on the forward channel information 36 and the destination subnet address 38. Specifically, under RIPv2 a forward channel identifier 36a, a next hop IP address 36b, and a metric 36c can be provided. It is also preferred that a subnet mask 40 is included in the route entry 34.

Figure 5:
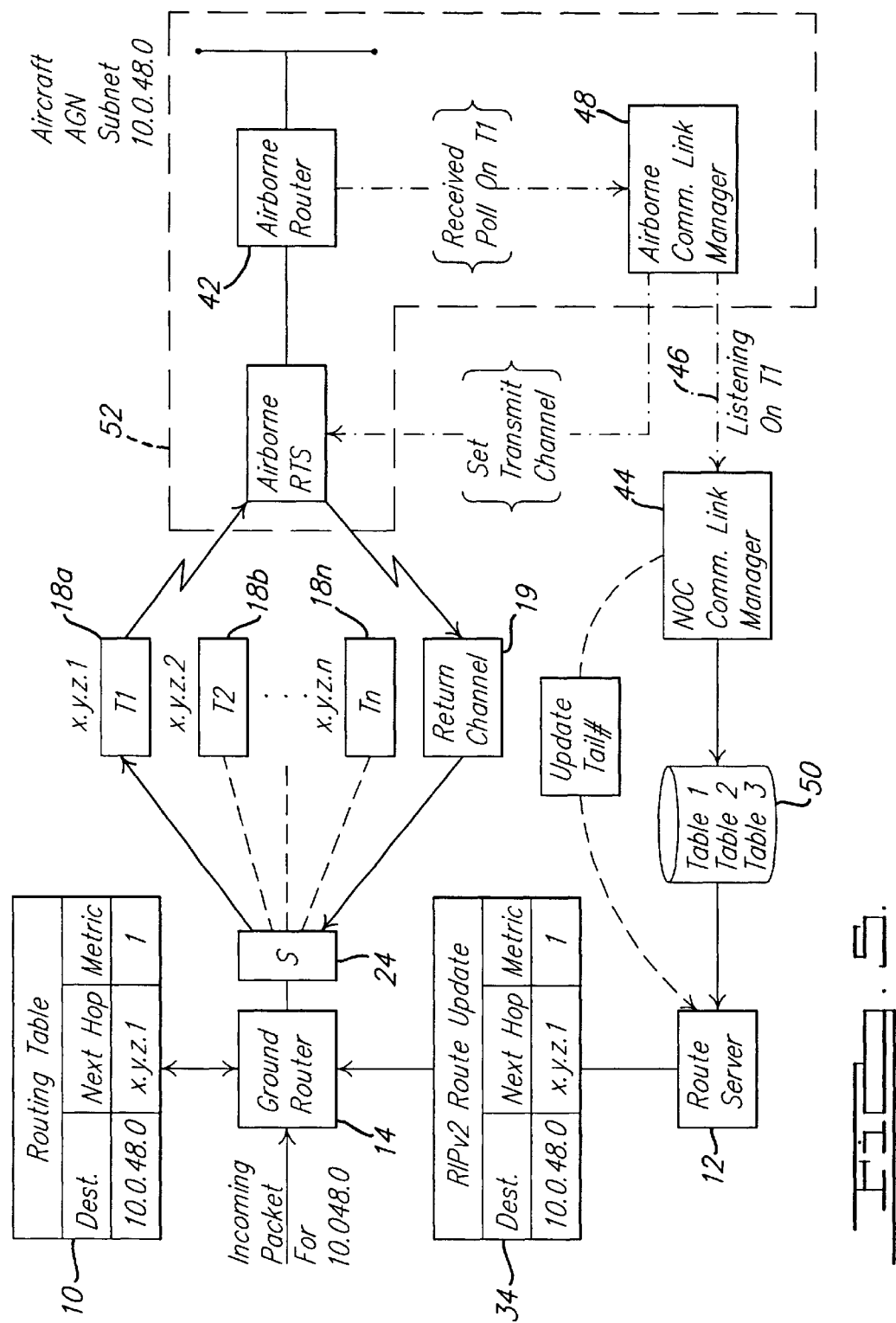
FIG. 5 is a block diagram demonstrating the population of an Internet protocol packet routing table in accordance with the principles of the present invention.

Turning now to FIG. 5, it can therefore be seen that an airborne router 42 of aircraft 52 and the ground router 14 are able to share link level routing information in a unique manner. It is important to note that an NOC communications link manager 44 is able to update the entries in the communications link table based on data from an airborne polling link 46. Specifically, manager 44 transmits a polling signal and adds an entry to the communications link table when the airborne communications link manager 48 responds to the polling signal. In the illustrated example, manager 48 is listening on forward channel T1 and enables manager 44 to register the aircraft 52 by providing the route server 12 with the tail number of the aircraft 52. The route server 12 in turn generates route entry 34 that is used by the ground router 14 in routing packets addressed to the destination subnet address corresponding to the aircraft 52.

Thus, the IP database 50 enables the aircraft 52 to register with the ground router 14 in cases of initial assent as well as cases of handoffs between ground networks. The handoff scenario is particularly relevant for international flight plans (such as flights from New York to London), in which the aircraft 52 would encounter multiple terrestrial networks. It should also be noted that the ground router 14 can use standard terrestrial routing protocols to notify the other routers out on the network that a new subnet (namely, the subnet for aircraft 52) has entered the network.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and following claims.

What is claimed:

1. A method for populating an Internet protocol (IP) packet routing table, the method comprising the steps of:
   converting a tail number of an aircraft into a destination subnet address for the aircraft;
   determining forward channel information for a ground router based on the tail number; and
   adding a route entry to the routing table based on the forward channel information and the destination subnet address such that the route entry enables the ground router to deliver IP packets to the aircraft.

2. The method of claim 1 further including the steps of:
   retrieving an aircraft identifier from an aircraft configuration table based on the tail number;
   determining a subnet class for the aircraft; and
   converting the aircraft identifier into the destination subnet address in accordance with the subnet class.

3. The method of claim 1 further including the step of retrieving the forward channel information from a communications link table.

4. The method of claim 3 further including the step of retrieving a forward channel identifier from the communications link table.

5. The method of claim 4 further including the step of retrieving a next hop address from a ground switching configuration table based on the forward channel identifier.

6. The method of claim 3 further including the step of retrieving a preference metric from the communications link table.

7. The method of claim 1 further including the step of building the route entry based on a next hop address.

8. The method of claim 7 further including the step of building the route entry based on a destination subnet address.

9. The method of claim 7 further including the step of building the route entry based on a subnet mask.

10. The method of claim 7 further including the step of building the route entry based on a preference metric, the preference metric defining a relative preference of data transmitted over the forward channel versus data transmitted over other forward channels.

11. A method for maintaining an Internet protocol (IP) communications link table, the method comprising the steps of:
    defining forward channel identifiers for a plurality of aircraft tail numbers;
    defining preference metrics for the plurality of aircraft tail numbers such that each tail number, corresponding forward channel identifiers and corresponding preference metric represents an entry in the communications link table; and
    dynamically updating the entries based on data from an airborne polling link.

12. The method of claim 11 further including the step of assigning preference metrics based on load balancing considerations.

13. The method of claim 11 further including the steps of:
    transmitting a polling signal; and
    adding an entry to the communications link table when a new tail number responds to the polling signal.

14. The method of claim 11 further including the step of removing an entry from the communications link table.

15. A method for populating an Internet protocol (IP) packet routing table, the method comprising the steps of:
    retrieving an aircraft identifier from an aircraft configuration table based on the tail number;
    determining a subnet class for the aircraft;
    converting the aircraft identifier into a destination subnet address in accordance with the subnet class;
    retrieving a forward channel identifier from a communications link table based on the tail number;
    retrieving a next hop address from a ground switching configuration table based on the forward channel identifier;

retrieving a preference metric from the communications link table, the preference metric defining a relative preference of data transmitted over the forward channel versus data transmitted over other forward channels; and building the route entry based on the next hop address and the preference metric.

16. The method of claim 15 further including the step of building the route entry based on the destination subnet address.

17. The method of claim 15 further including the step of building the route entry based on a subnet mask.

18. An Internet protocol (IP) database comprising:

an aircraft configuration table for linking a tail number of the aircraft to a corresponding aircraft identifier;

a communications link table for linking the tail number to forward channel information; and a ground switching table for linking the forward channel information to a next hop address such that the database enables addition of a routing entry to a routing table.

19. The database of claim 18 wherein the forward channel information includes a forward channel identifier.

20. The database of claim 18 wherein the forward channel information includes a preference metric, the preference metric defining a relative preference of data transmitted over the forward channel versus data transmitted over other forward channels.

* * * * *